United States Patent
Strasman

(10) Patent No.: US 8,902,753 B2
(45) Date of Patent: Dec. 2, 2014

(54) METHOD, SYSTEM AND COMPUTER READABLE MEDIUM FOR AFFECTING BIT RATE

(75) Inventor: Nery Strasman, Ramat Gan (IL)

(73) Assignee: Vasona Networks Inc., Santa Clara, CA (US)

( * ) Notice: Subject to any disclaimer, the term of this patent is extended or adjusted under 35 U.S.C. 154(b) by 0 days.

(21) Appl. No.: 13/426,633

(22) Filed: Mar. 22, 2012

(65) Prior Publication Data

US 2012/0269064 A1    Oct. 25, 2012

Related U.S. Application Data

(63) Continuation-in-part of application No. 13/233,043, filed on Sep. 15, 2011.

(60) Provisional application No. 61/383,414, filed on Sep. 16, 2010.

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04W 24/08 | (2009.01) | |
| H04W 92/14 | (2009.01) | |

(52) U.S. Cl.
CPC .............. *H04W 24/08* (2013.01); *H04W 92/14* (2013.01)
USPC ........ 370/235; 370/230; 370/230.1; 370/231; 370/236

(58) Field of Classification Search
USPC ................. 370/229–236, 252–253, 328–329, 370/331–335, 342, 351–356, 441; 455/403, 455/405, 422.1–425, 436–444, 446, 455/450–453
See application file for complete search history.

(56) References Cited

U.S. PATENT DOCUMENTS

| 6,385,673 B1 | 5/2002 | DeMoney |
|---|---|---|
| 6,697,378 B1 | 2/2004 | Patel |
| 8,205,004 B1 | 6/2012 | Kaufman et al. |
| 2003/0067872 A1 | 4/2003 | Harrell et al. |
| 2004/0203825 A1 | 10/2004 | Daniel et al. |
| 2005/0114538 A1 | 5/2005 | Rose |
| 2005/0148314 A1 | 7/2005 | Taglienti et al. |
| 2005/0204046 A1 | 9/2005 | Watanabe |
| 2006/0165029 A1* | 7/2006 | Melpignano et al. ......... 370/328 |

(Continued)

*Primary Examiner* — Awet Haile
*Assistant Examiner* — Eric Myers
(74) *Attorney, Agent, or Firm* — Oren Reches

(57) ABSTRACT

A method, a non-transitory computer readable medium and a system, the method is for affecting a bit rate of a session, the method may include determining, to introduce a desired change in a bit rate (BR) allocated by a BR allocator for streaming a portion of a first stream that is expected to flow from a source entity to a target entity; wherein the bit rate allocator is expected to set the BR allocated to the streaming of the portion in response to a BR associated with the first stream; modifying a value of the BR associated with the first stream to cause the BR allocator to introduce the desired change in the BR allocated for streaming the portion; and causing the BR allocator module to be aware to the modified value without instructing the BR allocator to introduce the desired change.

19 Claims, 10 Drawing Sheets

(56) References Cited

U.S. PATENT DOCUMENTS

| | | |
|---|---|---|
| 2008/0212480 A1 | 9/2008 | Shimonishi |
| 2009/0327079 A1 | 12/2009 | Parker et al. |
| 2010/0034089 A1 | 2/2010 | Kovvali et al. |
| 2010/0074275 A1 | 3/2010 | Sahai |
| 2010/0131671 A1 | 5/2010 | Kohli et al. |
| 2010/0151899 A1 | 6/2010 | Lekutai |
| 2010/0195602 A1* | 8/2010 | Kovvali et al. ............ 370/329 |
| 2011/0032898 A1 | 2/2011 | Kazmi et al. |
| 2011/0082924 A1 | 4/2011 | Gopalakrishnan |
| 2011/0145726 A1 | 6/2011 | Wei et al. |
| 2011/0197239 A1 | 8/2011 | Schlack |
| 2012/0039191 A1 | 2/2012 | Foster et al. |
| 2012/0052866 A1 | 3/2012 | Froehlich et al. |
| 2012/0087260 A1 | 4/2012 | Devarapalli et al. |
| 2013/0016620 A1 | 1/2013 | Den Hartog et al. |
| 2013/0163428 A1 | 6/2013 | Lee et al. |

* cited by examiner

METHOD, SYSTEM AND COMPUTER READABLE MEDIUM FOR AFFECTING BIT RATE

RELATED APPLICATIONS

This application is a continuation in part of U.S. patent application Ser. No. 13/233043 filed Sep. 15, 2011, which in turn is claims priority from provisional patent filing date Sep. 16, 2010, Ser. No. 61/383,414, both being incorporated herein by reference.

BACKGROUND OF THE INVENTION

The Architecture of modern wireless networks allows radio access network (RAN) to interface with the Internet or other external networks via so called core networks.

The following abbreviations represent various modern wireless networks, their components and some communication protocols:

In existing third and fourth generation (3G and 4G) wireless networks, various transcoders and trans-raters can determine which bit rate to allocate for streaming media streams towards the RAN, wherein the determination can be affected by the bit rate if the streaming media streams. These devices may use propriety algorithms that are responsive to the bit rate of the streaming media streams but their details are not known outside the devices.

SUMMARY OF THE INVENTION

According to an embodiment of the invention a method may be provided for affecting a bit rate of a session, the method may include determining, by a bandwidth management module, to introduce a desired change in a bit rate allocated by a bit rate allocator for streaming a portion of a first stream; wherein the first stream is expected to flow from a source entity to a target entity; wherein the source and target entities are coupled to the bit rate allocator and to the bandwidth management module; wherein the bit rate allocator is expected to set the bit rate allocated to the streaming of the portion in response to a bit rate associated with the first stream; modifying a value of the bit rate associated with the first stream to provide a modified value; wherein the modifying is expected to cause the bit rate allocator to introduce the desired change in the bit rate allocated for streaming the portion; and causing the bit rate allocator module to be aware to the modified value without instructing the bit rate allocator to introduce the desired change.

The modifying may include modifying the value of the bit rate associated with the first stream comprises modifying a bit rate of the first stream.

The modifying may include modifying a value of metadata indicative of the bit rate associated with the first stream. The metadata may include modifying congestion control metadata or flow control metadata.

The determining may be responsive to bit rates allocated for streaming portions of other streams that are destined to at least one entity that differs from the target entity.

The determining may be responsive to at least one out of a source entity attribute and a target entity attribute.

The determining may be responsive to a quality of service level assigned to the first stream.

The method may include emulating congestion or any other streaming errors or failures.

The method may include modifying the value of the bit rate associated with the first stream such as to cause the bit rate allocator to increase the bit rate allocated by the bit rate allocator to the streaming of the portion.

The bit rate allocator may be a bit rate manipulator that is arranged to modify the portion.

The bit rate allocator may be a bit rate selector that is arranged to select a version of the portion out of multiple versions of the portions, the multiple versions differ from each other by bit rate.

A non-transitory computer readable medium may be provided according to an embodiment of the invention and may store instructions for executing any stage of any method disclosed in the specification. For example, it may store instructions for determining, by a bandwidth management module, to introduce a desired change in a bit rate allocated by a bit rate allocator for streaming a portion of a first stream; wherein the first stream is expected to flow from a source entity to a target entity; wherein the source and target entities are coupled to the bit rate allocator and to the bandwidth management module; wherein the bit rate allocator is expected to set the bit rate allocated to the streaming of the portion in response to a bit rate associated with the first stream; modifying a value of the bit rate associated with the first stream to provide a modified value; wherein the modifying is expected to cause the bit rate allocator to introduce the desired change in the bit rate allocated for streaming the portion; and causing the bit rate allocator module to be aware of the modified value without instructing the bit rate allocator to introduce the desired change.

A system may be provided may be provided according to an embodiment of the invention and may be arranged to execute any stage of any method disclosed in the specification. For example, it may include a bandwidth management module that may include a processor arranged to determine to introduce a desired change in a bit rate allocated by a bit rate allocator for streaming a portion of a first stream; wherein the first stream is expected to flow from a source entity to a target entity; wherein the source and target entities are coupled to the bit rate allocator and to the bandwidth management module; wherein the bit rate allocator is expected to set the bit rate allocated to the streaming of the portion in response to a bit rate associated with the first stream; a modifier arranged to modify modifying a value of the bit rate associated with the first stream to provide a modified value; wherein the modifying is expected to cause the bit rate allocator to introduce the desired change in the bit rate allocated for streaming the portion; and an interface arranged to cause the bit rate allocator module to be aware of the modified value without instructing the bit rate allocator to introduce the desired change.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

Figure 1:
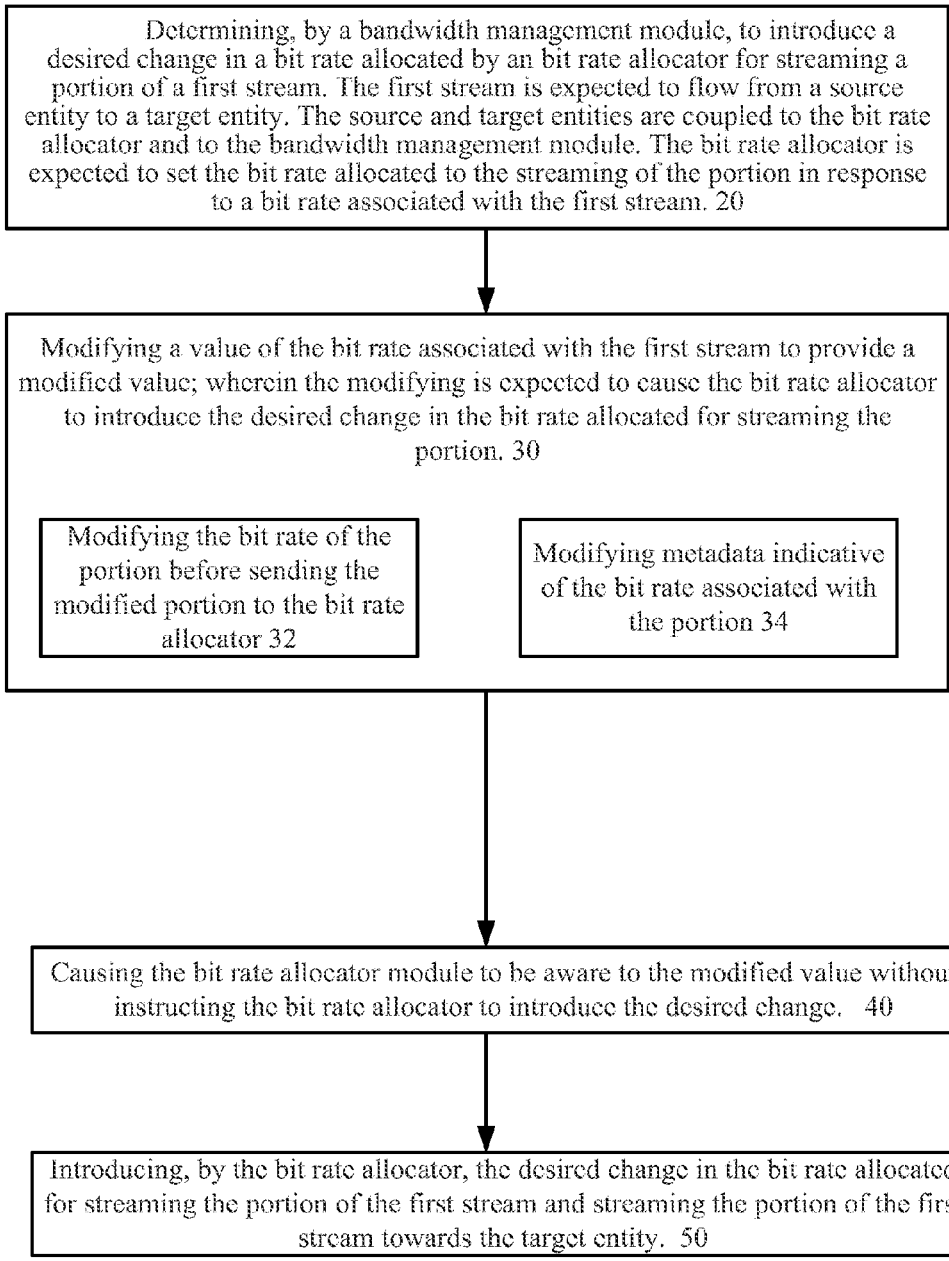
FIG. 1 illustrates a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "modeling" can have its regular meaning and can be interpreted as including generation of information that represents a status of an entity. The status can reflect one or a plurality of parameters and their values. A model of an entity of a Radio Access Network can change over time.

The term "packet switched network" (PSN) refers to a network that packetized information to packets and additionally or alternatively transfers packets over the network. The PSN can be a local area network, a wide area network, a wired network, a wireless network. The Internet is a non-limiting example of a PSN.

The term "streaming" may include presenting content by an entity while the content is being provided to the entity.

The term "bit rate allocator" refers to an entity that may allocate bit rates for streaming purposes. The bit rate allocator can be included in a source entity that is a source of streamed content or can be an intermediate entity located between the source entity and the target entity. The bit rate allocator can include (or be hosted by) one or more computerized entities such as servers, host computer, desktop computer, blade processor, digital signal processor, controller and the like. The bit rate allocator can include hardware, software, middleware components or a combination thereof. The bit rate allocator can be implemented by software that is executed by a computerized entity.

The bit rate allocator can be a bit rate manipulator that may be arranged to modify a first stream. The modification can include compression, encoding, transcoding (decoding that is followed by encoding), and the like. Additionally or alternatively, the bit rate allocator can be a bit rate selector that is arranged to select a version of the first stream out of multiple versions of the first stream that differ from each other by bit rate.

The bit rate allocator can determine a bit rate to be allocated for streaming a portion of a first stream in response to a value of a bit rate associated with the first stream. The bit rate allocator can perform this determination based on one or more additional parameters such as but not limited to bandwidth allocated to other sessions for other streams.

According to the bit rate allocator bitrates are allocated for streaming content. The bit rate allocation can be affected by a bandwidth management module that differs from the bit rate allocator and may be located downstream to the bit rate allocator. The bandwidth management module should not explicitly alter the bit rate allocation (it should not send explicit commands to the bit rate allocator) but rather try to change the bit rate allocation by changing what the bit rate allocator may see as a state of the network, the state of traffic, a state of a link over which the content is being streamed or a state of another link.

The bit rate allocator usually has a mechanism that senses if the streaming of content is successful. It may sense the quality of service provided by the bit rate allocator. Usually, a bit rate allocator will allocate lower bit rates if it senses streaming failures that may indicate congestion. Thus, the bandwidth management module can emulate communication failures and this will cause the bit rate allocator to reduce the allocated bit rate for streaming content. On the other hand the bandwidth management module can send multiple acknowledgement messages or otherwise emulate a state of the network as having more available bandwidth than it actually has and thus may cause the bit rate allocator to increase the bit rate allocated for streaming content.

The following description refers to wireless networks. According to various embodiments of the invention it is applicable to wired networks. Non limiting examples of networks can include but are not limited to DSL networks, DOCSIS, HFC, hybrid networks, PSTN networks, ATM networks, point to point networks, wi-fi networks, wi-max networks, ODFM networks, and the like. The streaming of content can be executed over one or more networks, There is provided a method for affecting the bit rate of a session. The method may include:
1. Determining, by a bandwidth management module, to introduce a desired change in a bit rate allocated by a bit rate allocator for streaming a portion of a first stream. The first stream is expected to flow from a source entity to a target entity. The source and target entities are coupled to the bit rate allocator and to the bandwidth management module. The bit rate allocator is expected to set the bit rate allocated to the streaming of the portion in response to a bit rate associated with the first stream.
2. Modifying a value of the bit rate associated with the first stream to provide a modified value. The modifying is expected to cause the bit rate allocator to introduce the desired change in the bit rate allocated for streaming the portion.
3. Causing the bit rate allocator module to be aware to the modified value without instructing the bit rate allocator to introduce the desired change.

The method can be applied by a bandwidth management module that can be coupled to a bit rate allocator that can be coupled between a source entity and a target entity.

Any one of the bandwidth management module, target entity and source entity can include (or can be hosted by) one or more computerized entities such as servers, host computer, desktop computer, blade processor, digital signal processor, controller and the like. The bit rate allocator can include hardware, software, middleware components or a combination thereof. The bit rate allocator can be implemented by software that is executed by a computerized entity.

Either one of the source entity and the target entity can be coupled to the bit rate allocator via one or more networks or links.

For simplicity of explanation the following text will refer to a bandwidth management module and to an intermediate module, whereas at least one of these entities belongs to a core network or is coupled between the core network and a packed switched network (PSN) such as not limited to the internet. It is also assumed, in the following text and for simplicity of explanation only, that at least one of the target entity and the source entity belongs to the PSN, is coupled to the PSN, belongs to a Radio Access Network (RAN) or is coupled to the RAN. These examples are not intended to limit the scope of the invention.

FIG. 1 illustrates method 10 according to an embodiment of the invention.

Method includes stages 20, 30 and 40, all being executed by a bandwidth management module. It can also include stage 50 that is executed by the bit rate allocator.

Stage 20 includes determining, by a bandwidth management module, to introduce a desired change in a bit rate allocated by a bit rate allocator for streaming a portion of a first stream. The first stream is expected to flow from a source entity to a target entity. The source and target entities are coupled to the bit rate allocator and to the bandwidth management module. The bit rate allocator is expected to set the bit rate allocated to the streaming of the portion in response to a bit rate associated with the first stream.

The desired change can include increasing the bit rate, reducing the bit rate, changing the bit rate by a certain amount, changing the bit rate such as to cause the bit rate to be within a desired range, changing a selection of the bit rate out of multiple finite possible bit rate values.

The determining of the modification can take into account the expected behavior of the bit rate allocator. The expected behavior can be known in advance, can be monitored and learnt or can be a combination thereof. As a rule of thumb, desired changes of higher accuracy may require a better knowledge of the behavior of the bit rate allocator. It is noted that the information required for causing the bit rate allocator to increase the bit rate allocation by a certain amount can be the same or may differ from the information required for causing the bit rate allocator to reduce the bit rate by the certain amount.

It may be assumed that the bit rate allocator can reduce the bit rate allocation when it senses congestion. Congestion can be sensed by the bit rate allocator by receiving requests to re-transmit streamed content, by lack of acknowledgments, by connection failures and the like The determining of modification of bit rate allocation can be responsive to one or more parameters such as a quality of service associated with the source entity; a quality of service associated with the target entity; a quality of service associated with a combination of the target and source entity; a priority associated with the source entity; a priority associated with the target entity; a priority associated with a combination of the target and source entity; a quality of service associated with an entity that differ from the target entity and the source entity; a priority associated with an entity that differ from the target entity and the source entity; a state of the bit rate allocator; a state of one or more networks coupled to (or including) at least one of the source entity, the target entity, the bit rate allocator and the bandwidth management module; a time of the determining; expected streaming patterns of the target entity; known streaming patterns of the source entity; expected streaming patterns of the target entity; known streaming patterns of the target entity; the content of the portion; expected results that may result from an allocation of bit rate to the streaming of the portion.

The method can be applied for controlling the bit rate of a portion that is streamed towards and even over a RAN. The determining can be responsive to the state of the RAN.

Stage 30 may include modifying a value of the bit rate associated with the first stream to provide a modified value. The modifying is expected to cause the bit rate allocator to introduce the desired change in the bit rate allocated for streaming the portion.

Stage 40 may include causing the bit rate allocator module to be aware to the modified value without instructing the bit rate allocator to introduce the desired change.

Stage 50 may include introducing, by the bit rate allocator, the desired change in the bit rate allocated for streaming the portion of the first stream and streaming the portion of the first stream towards the target entity.

Stage 30 may include stage 32 of modifying of the bit rate of the portion of the first stream before sending the modified portion to the bit rate allocator.

Stage 30 may include stage 34 of modifying a value of metadata indicative of the bit rate associated with the first stream. The metadata can be (or can include) congestion control metadata, and additionally or alternatively can be (or can include) flow control metadata.

Congestion control metadata can be, for example TCP congestion control metadata such as acknowledgements. These acknowledgements can be dropped, can be duplicated, and additionally or alternatively can be transmitted at timings that fit a desired round trip time (RTT) that can affect the bit rate allocation applied by the bit rate allocator.

The modifying can include changing status information indicative of fullness of a receiver buffer, changing a window indicative of the amount of information a receiver can receive and the like.

Non limiting example of such modifications can include changing TCP protocol flow control and/or congestion avoidance parameters.

Figure 2:
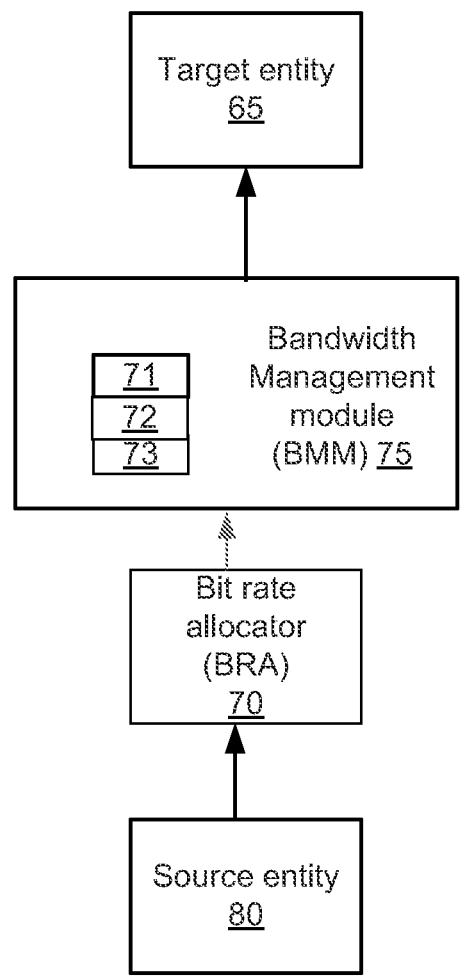
FIG. 2 illustrates various entities according to an embodiment of the invention.

FIG. 2 illustrates a source entity (SE) 80 that is coupled to a bit rate allocator 70. The bit rate allocator 70 is coupled to the bandwidth management module 75 that in turn is coupled to target entity (TE) 65.

The bandwidth management module (BMM) 70 is arranged to (a) determine (for example by processor 71) to introduce a desired change in a bit rate allocated by a bit rate allocator for streaming a portion of a first stream; wherein the first stream is expected to flow from a source entity to a target entity; wherein the source and target entities are coupled to the bit rate allocator and to the bandwidth management module; wherein the bit rate allocator is expected to set the bit rate allocated to the streaming of the portion in response to a bit rate associated with the first stream; (b) to modify (for example by modifier 72) a value of the bit rate associated with the first stream to provide a modified value; wherein the modifying is expected to cause the bit rate allocator to introduce the desired change in the bit rate allocated for streaming the portion; and to (c) cause (for example by interface 73) the bit rate allocator module to be aware to the modified value without instructing the bit rate allocator to introduce the desired change.

According to an embodiment of invention, the BMM 75 does not receive status information about a RAN. The BMM 75 can operate without knowing the state of the RAN or any other network.

According to another embodiment of the invention the BMM 75 can make its determinations based upon the state of a network (such as the RAN) or at least upon control messages that are intercepted by a probe.

FIGS. 3A-3D and 4A-4C illustrate various networks that facilitate streaming. In these networks the target entity is illustrates as either a mobile station (denoted 180 in FIGS. 3A-3D) or as a user equipment (UE) (denoted 210 in FIGS. 4A-4D).

Figure 3A:
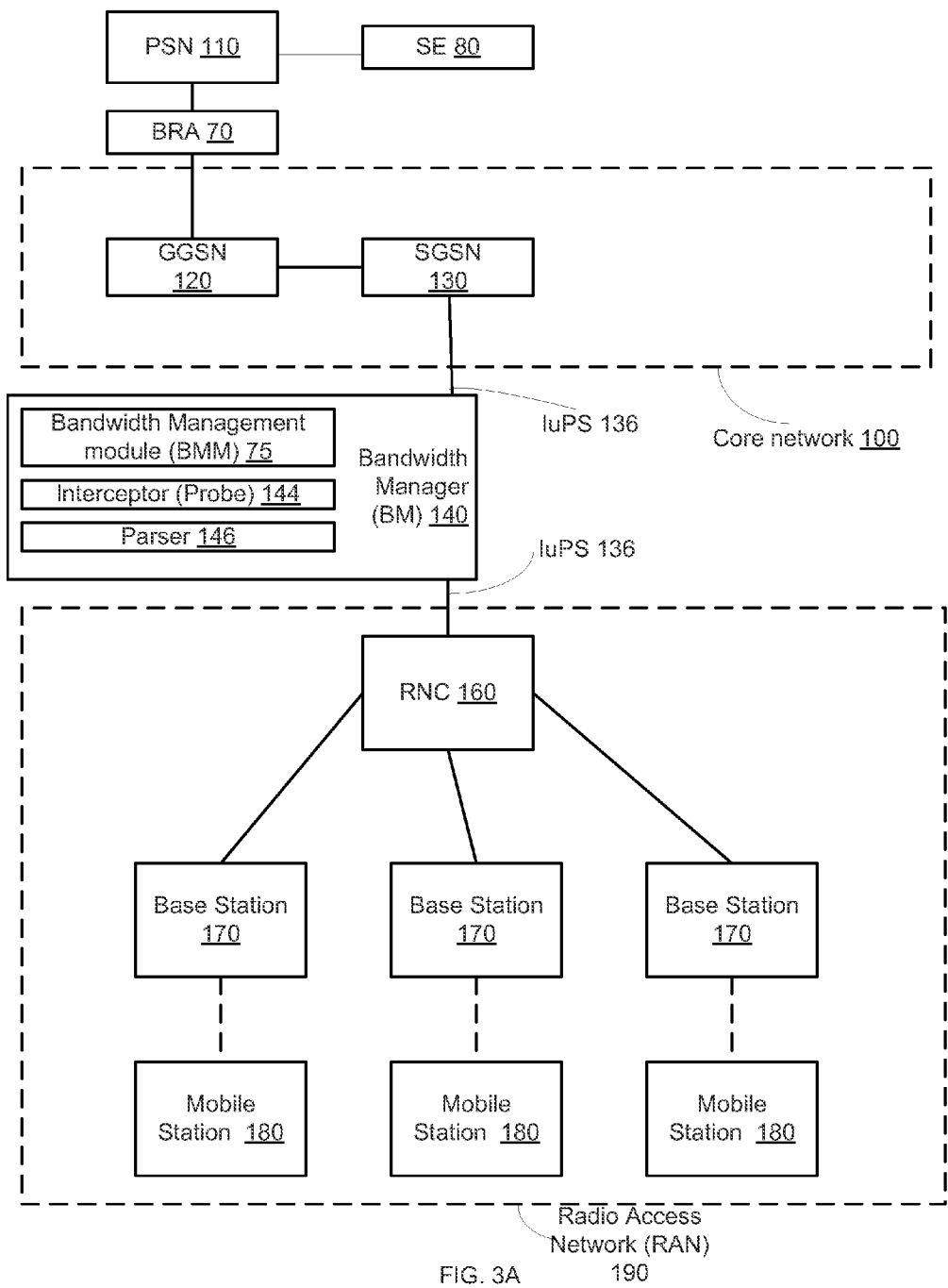
FIGS. 3A-3D illustrates systems and their environments according to various embodiments of the invention.
Figure 4A:
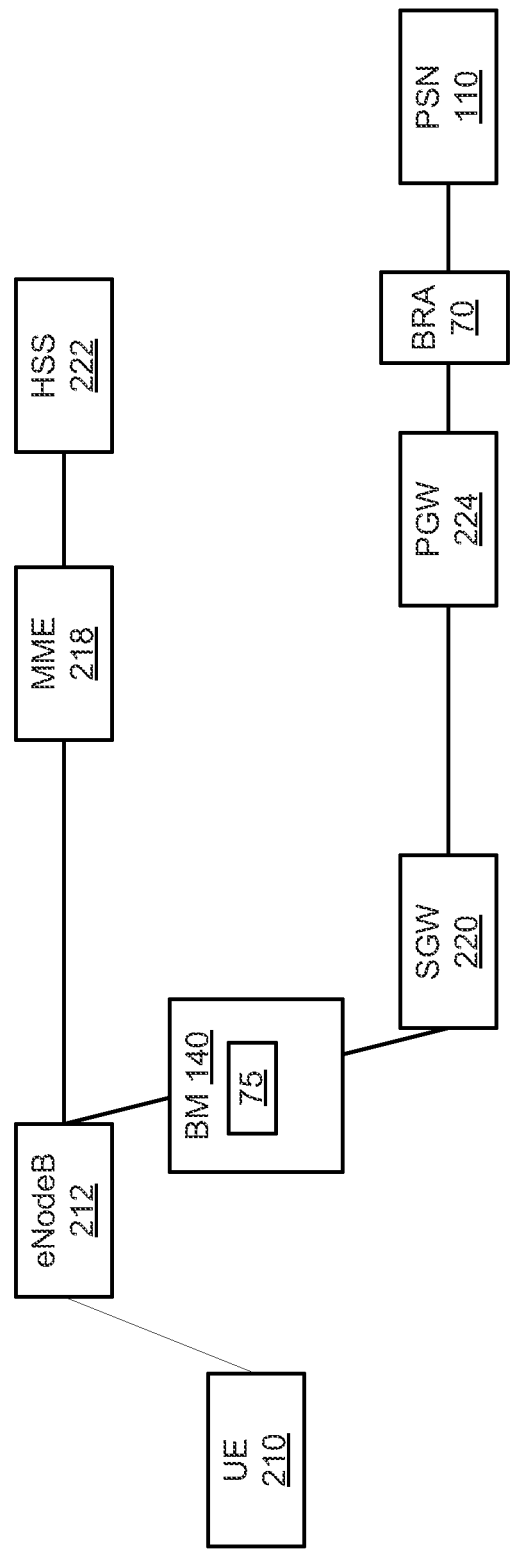
FIGS. 4A-4D illustrates a system and its environment according to an embodiment of the invention.
Figure 4B:
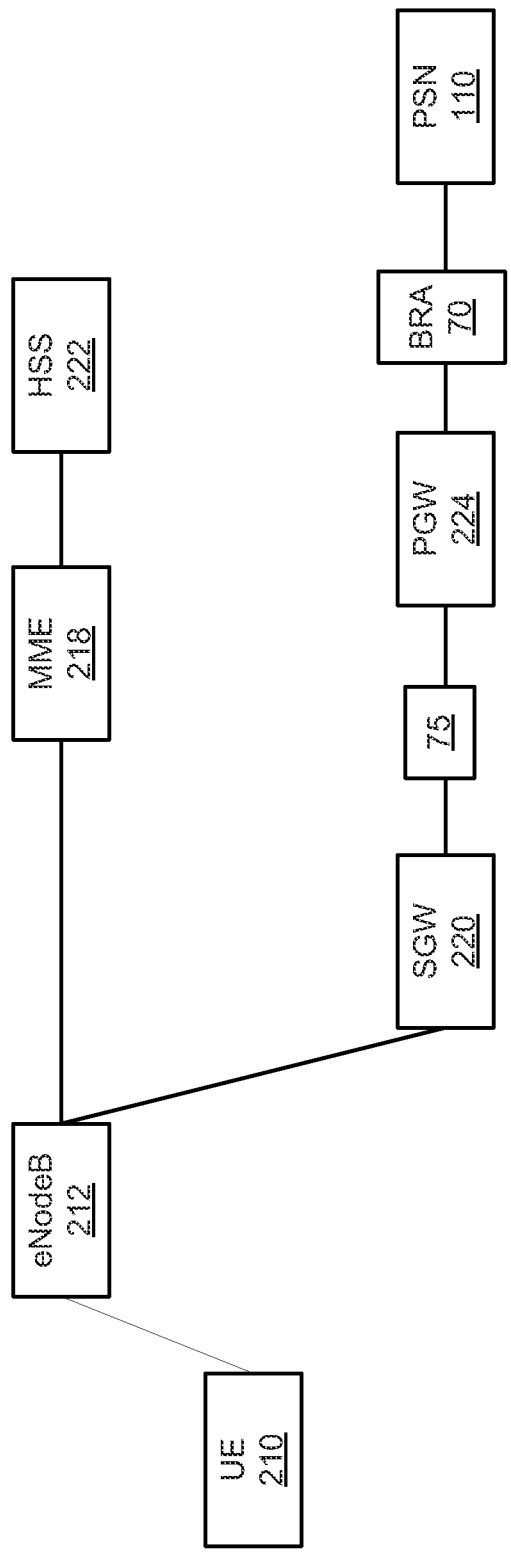

The BMM 75 can be a part of a bandwidth manager (BM) 140 that can include (in addition to the BMM) a probe 144 and a parser 146 for parsing the intercepted control massages. Various non-limiting examples of such configurations are illustrated in FIGS. 3A and 4A.

Figure 3D:
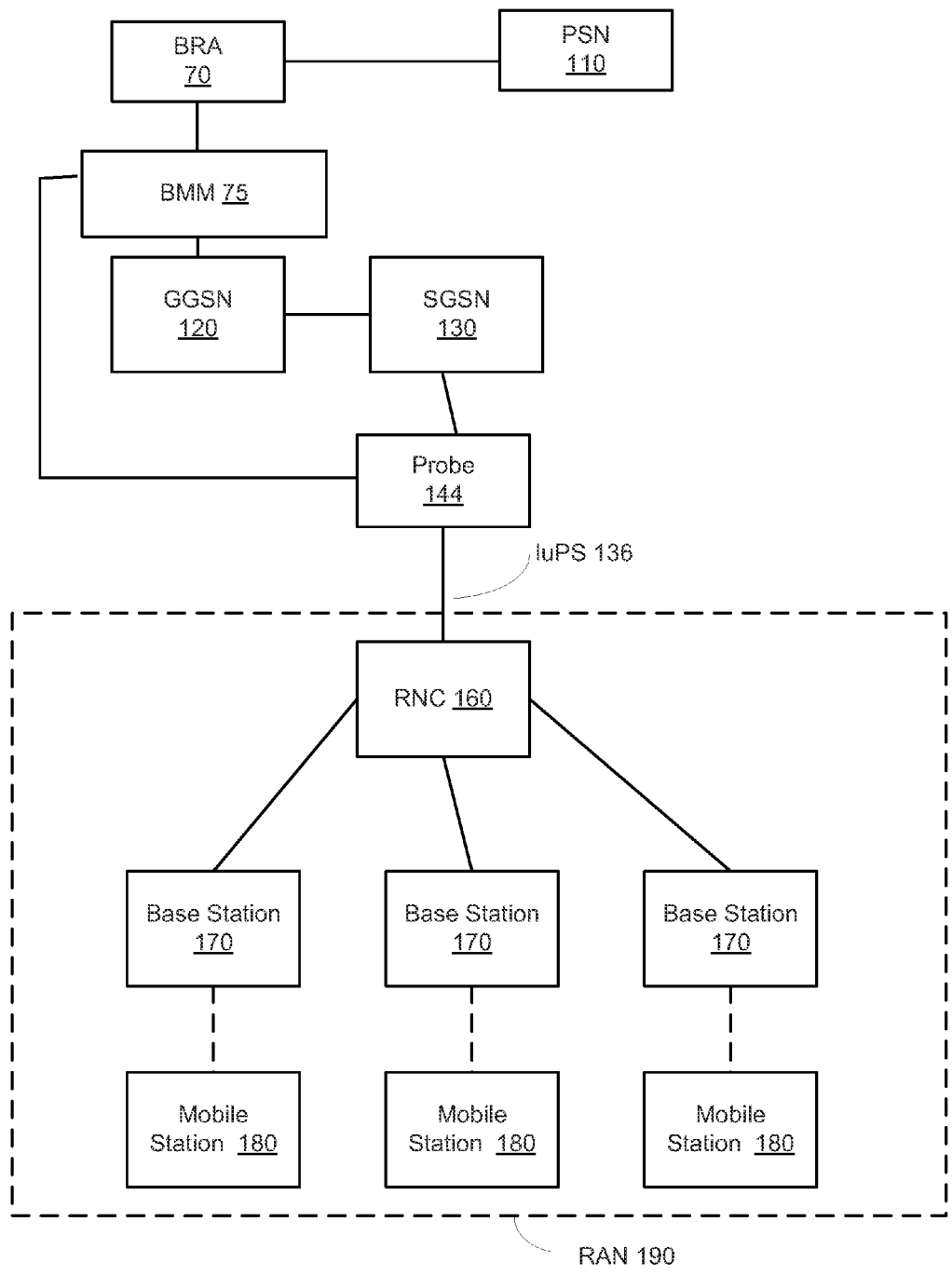
Figure 4C:
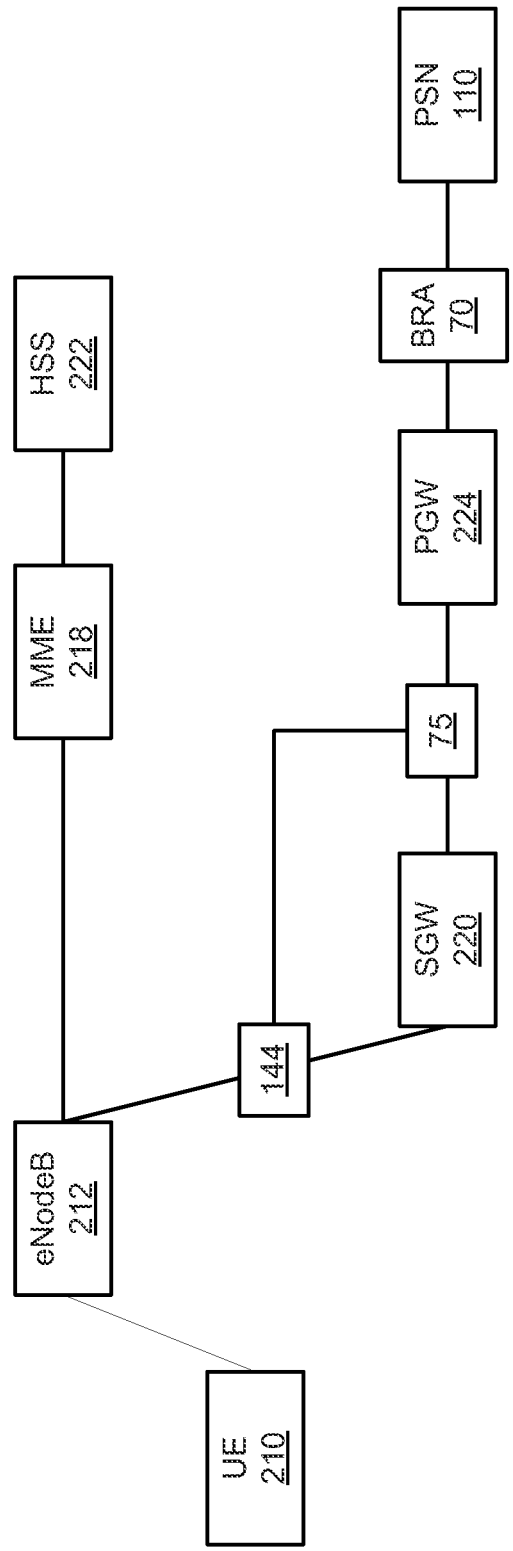
Figure 4D:
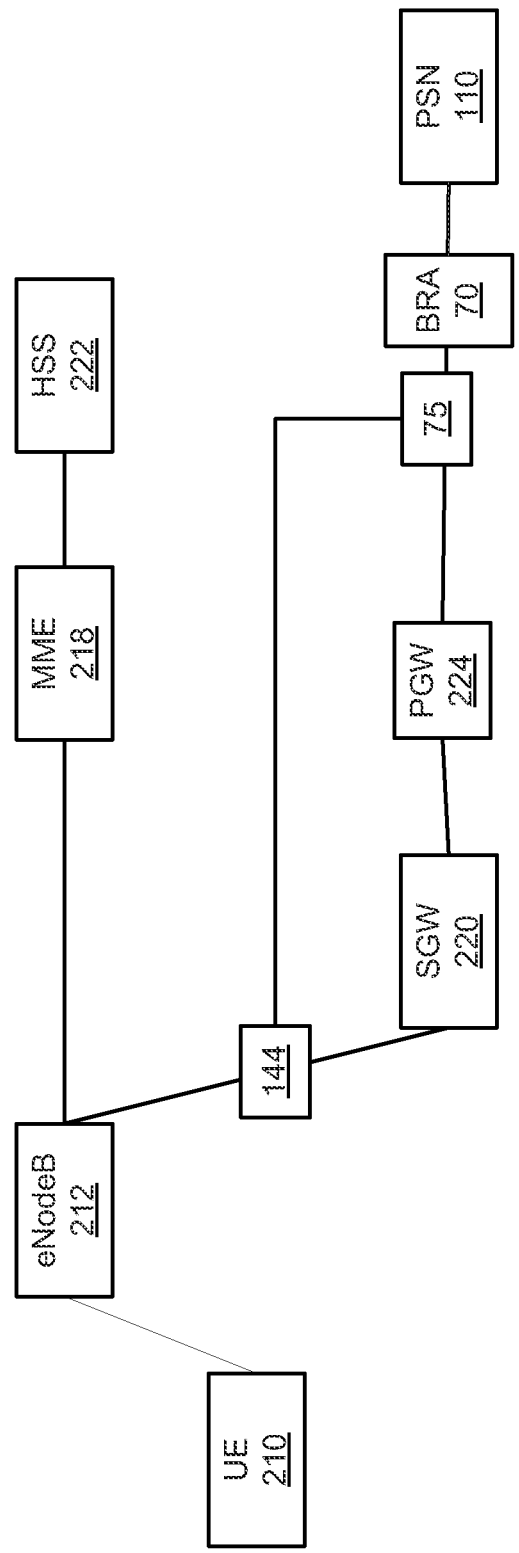

Alternatively, the BMM 75 can be coupled to the BM 140 or to one or more elements such as the probe 144. Various non-limiting examples of such configurations are illustrated in FIGS. 3D, 4C, 4D.

Yet according to another embodiment the BMM 75 can exist while the other components of the BM 140 are absent (or at least do not share information with the BMM 75). Various non-limiting examples of such configurations are illustrated in FIGS. 3B, 3C, 4B and 5.

Figure 3B:
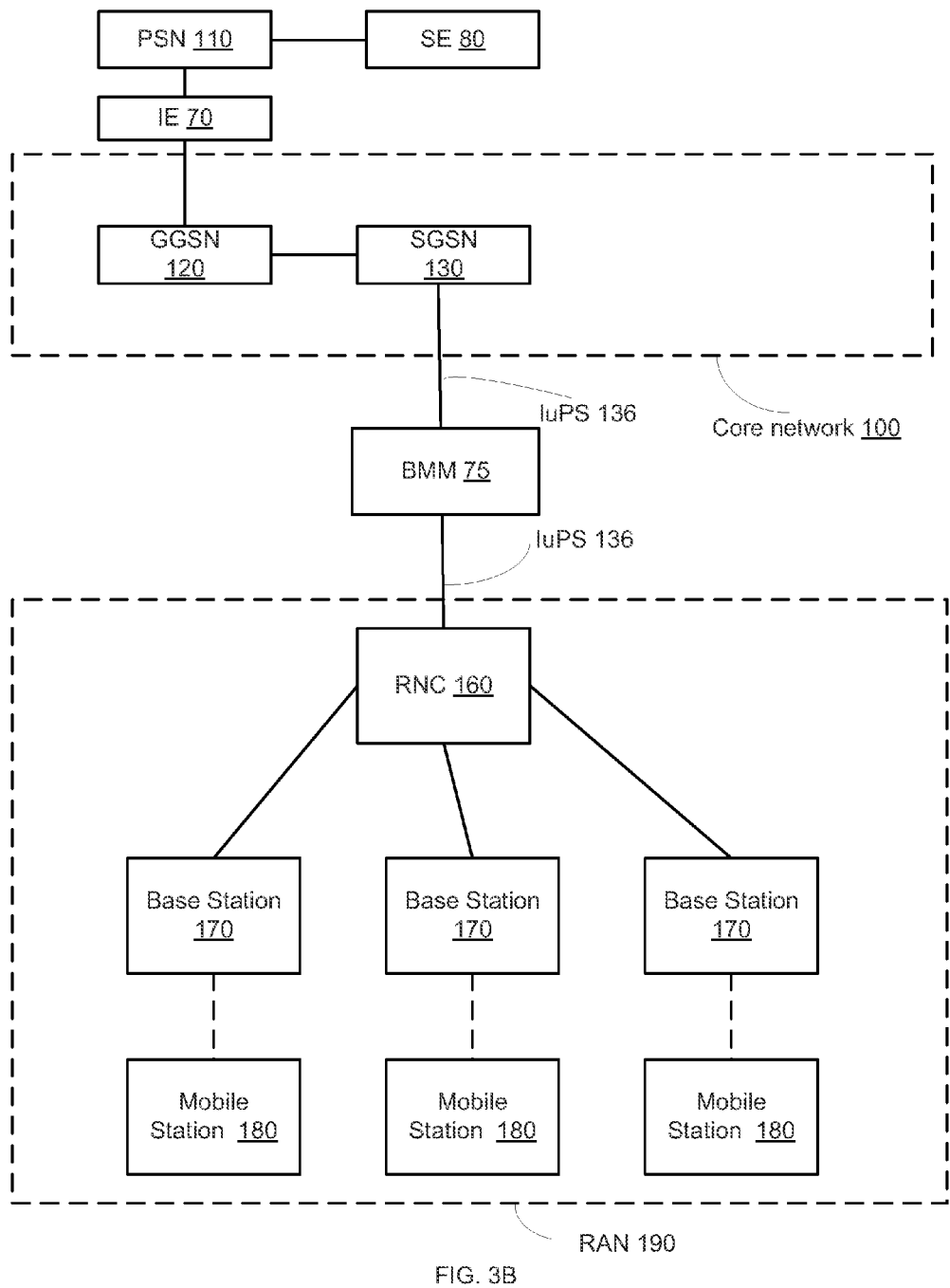
Figure 3C:
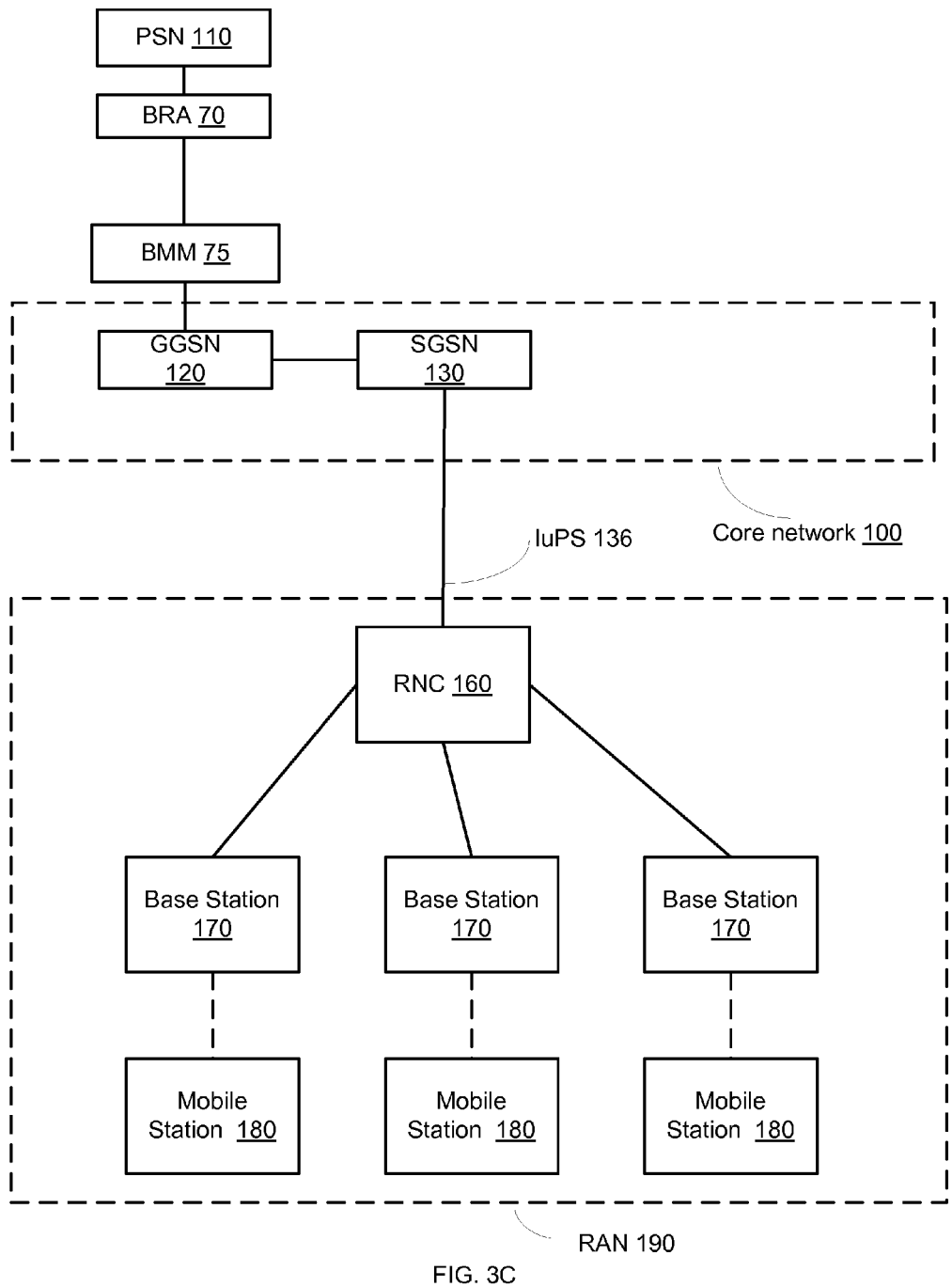

FIG. 3B illustrates the target entity 65 as being connected to a mobile station 180. Some of the following figures do not include the target entity 65. This is done for simplicity of explanation.

FIG. 3B illustrates the source entity 80 as being connected to the PSN 110. Some of the following figures do not include the source entity 80. This is done for simplicity of explanation.

Table 1 illustrates the position and connectivity of the bit rate allocator 70 and of the BMM 75.

arranged for processing the control plane messages in order to evaluate to state of the RAN. BM 140 is illustrated as being coupled to IuPS 136 interfaces.

It is noted that the BM 140 may also track after user data sessions and that BM 140 can also perform various operations in response to the state of the RAN, such as congestion estimation, congestion prevention, and the like.

The BM 140 may enforce bandwidth management decisions it makes. For example, the BM 140 models the RAN, and in response to the model it can allocate a target bit rate for each application session. The BM 140 then tries to enforce the bit rate for the application session using various techniques. The technique used depends on the type of application session. The BM 140 may control the bit rate on both directions—uplink and downlink. Thus, a stream that is intended to be provided from the core network to the RAN can be compressed, delayed, statistically multiplexed with other streams before it passes towards the RAN. The same applies to streams that are sent from the RAN to the core network. Additionally or alternatively, the BM 140 can send bit rate allocation values to entities of the core network and/or to entities of the RAN and request these entities to enforce these bit rate allocation values.

TABLE 1

| FIG. | BMM | BRA 70 |
| --- | --- | --- |
| 3A | Included in BM 140 | Coupled between SGSN 130 and RAN 190 | Coupled between PSN 110 and GGSN 120 |
| 3B | Not included in BM 140 | Coupled between SGSN 130 and RAN 190 | Coupled between PSN 110 and GGSN 120 |
| 3C | Not included in BM 140 | Coupled between SGSN 130 and BRA 70 | Coupled between PSN 110 and BMM 75 |
| 3D | Coupled to probe 144 that is coupled between RAN 190 and SGSN 130 | Coupled between SGSN 130 and BRA 70 | Coupled between PSN 110 and BMM 75 |
| 4A | Included in BM 140 | Coupled between eNodeB 212 and SGW 220 | Coupled between PGW 224 and PSN 110 |
| 4B | Not included in BM 140 | Coupled between SGW 220 and PGW 224 | Coupled between PGW 224 and PSN 110 |
| 4C | Coupled to probe 144 that is coupled between SGW 220 and eNodeB 212 | Coupled between SGW 220 and PGW 224 | Coupled between PGW 224 and PSN 110 |
| 4D | Coupled to probe 144 that is coupled between SGW 220 and eNodeB 212 | Coupled between BRA 70 and PGW 224 | Coupled between BMM 75 and PSN 10 |

Modeling the RAN

According to various embodiments of the invention various systems, non-transitory computer readable medium and methods are provided that can accurately model a Radio Access Network. By taking into account the RAN condition, it is possible to make better decisions on optimizing the data and video traffic and to determine the bit rate that should be allocated by a bit rate allocator for streaming a portion of a media stream. The right optimization tools can be used depending on whether a particular radio cell is underutilized or saturated. U.S. patent application Ser. No. 13/1233043 filed Sep. 15, 2011, illustrated a modeling of a RAN and is incorporated herein by reference.

FIG. 3A illustrates Bandwidth manager (BM) 140, core network 100 and RAN 190 according to an embodiment of the invention.

BM 140 may include an interceptor (such as a probe) 144 for intercepting control plane messages, parser 146 for parsing the control plane messages and BMM 75 that may be The core network 100 is coupled to an operator PSN 110 such as the Internet or a private packet data network. The core network 110 may include GGSN 120 and SGSN 130. The GGSN 120 is coupled between the PSN 110 and the SGSN 130.

The RAN 190 includes a RNC 160 that is coupled to multiple base stations 170 that in turn are wirelessly coupled to target entities such as mobile stations 180.

The BM 140 can be placed closer to either the SGSN 130 or the RNC 160. There is no restriction on its physical placement. Additionally, the functions of the BM 140 can be implemented within the SGSN 130 or the RNC 160.

In the case of 4G networks, the BM 140 can be placed between the eNodeB, the MME/SGW (Serving Gateway).

FIG. 4A illustrates BM 140 as being coupled to eNodeB 212 and to the SGW 220.

The BM 140 parses all S1 messages between the eNodeB 212, MME 218 and UE 210. This includes S1-AP messages between the MME 218 and the eNodeB 212, and the NAS signaling messages between the MME 218 and the UE 210.

The BM 140 can be placed closer to either the core network nodes like the MME 218 and the SGW 220 or closer to the eNodeB 212. Additionally, multiple BM modules can be implemented within these devices and will have to exchange information about each of these devices.

The UE 210 is also sometimes called the Mobile Station (MS). It can be any device (including cell phones, laptop modems) that can attach to a 3G or a 4G network.

FIGS. 3A-3D illustrate in-path configurations according to two embodiments of the invention, in which all traffic between the RAN and the core network passes through the BM 140.

In addition to processing the control plane messages, the BM may also monitor how much data traffic (both downlink and uplink) is being sent/consumed by each user on the user plane. By mapping each user's session to a cell, and the downlink and uplink bandwidth associated with each session, the Bandwidth manager computes the aggregate bandwidth that is being consumed at any time for each cell.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for affecting a bit rate of a session, the method comprising:
    determining, by a bandwidth management module, to introduce a desired change in a bit rate allocated by a bit rate allocator for streaming a portion of a first stream;
    wherein the first stream flows from a source entity to a target entity;
    wherein the source and target entities are coupled to the bit rate allocator and to the bandwidth management module; wherein the bit rate allocator to sets the bit rate allocated to the streaming of the portion in response to a bit rate associated with the first stream; wherein the bandwidth management module (a) differs from the bit rate allocator, (b) is coupled to the bit rate allocator, and (c) is located between the target entity and the bit rate allocator;
    modifying, by the bandwidth management module, a value of the bit rate associated with the first stream to provide a modified value; wherein when the desired change is an increase in the bit rate, the modifying comprises sending, by the bandwidth management module, a message that indicates that the network has more available bandwidth than the network actually has; wherein when the desired change is a decrease in the bit rate, the modifying comprises sending, by the bandwidth management module, a message that indicates a false state of congestion in the network; wherein the modifying causes the bit rate allocator to introduce the desired change in the bit rate allocated for streaming the portion; and
    causing the bit rate allocator module to be aware to the modified value without instructing the bit rate allocator to introduce the desired change.

2. The method according to claim 1, wherein the modifying comprises modifying a value of metadata indicative of the bit rate associated with the first stream.

3. The method according to claim 2, wherein the metadata comprises congestion control metadata or flow control metadata.

4. The method according to claim 1, wherein the determining is responsive to bit rates allocated for streaming portions of other streams that are destined to at least one entity that differs from the target entity.

5. The method according to claim 1, wherein the determining is responsive to at least one out of a source entity attribute and a target entity attribute.

6. The method according to claim 1, wherein the determining is responsive to a quality of service level assigned to the first stream.

7. The method according to claim 1, comprising modifying the value of the bit rate associated with the first stream such as to cause the bit rate allocator to increase the bit rate allocated by the bit rate allocator to the streaming of the portion.

8. The method according to claim 1, wherein the modifying comprises modifying a timing of a transmission of acknowledgements sent by the bandwidth management module to the bit rate allocator so that the timing of the transmission of the acknowledgements fits a desired round trip time (RTT) and thereby affecting the bit rate allocation applied by the bit rate allocator.

9. The method according to claim 1, comprising selecting, by the bit rate allocator a version of the portion out of multiple versions of the portions, the multiple versions differ from each other by bit rate.

10. A non-transitory computer readable medium that stores instructions for: determining to introduce a desired change in a bit rate allocated by a bit rate allocator for streaming a portion of a first stream; wherein the first stream flows from a source entity to a target entity; wherein the source and target entities are coupled to the bit rate allocator and to a bandwidth management module;
    wherein the bit rate allocator sets the bit rate allocated to the streaming of the portion in response to a bit rate associated with the first stream; modifying a value of the bit rate associated with the first stream to provide a modified value; wherein when the desired change is an increase in the bit rate, the modifying comprises sending, by the bandwidth management module, a message that indicates that the network has more available bandwidth than the network actually has; wherein when the desired change is a decrease in the bit rate, the modifying comprises sending, by the bandwidth management module, a message that indicates a false state of congestion in the network; wherein the modifying causes the bit rate allocator to introduce the desired change in the bit rate allocated for streaming the portion; wherein the bandwidth management module (a) differs from the bit rate allocator, (b) is coupled to the bit rate allocator, and (c) is located between the target entity and the bit rate allocator; and causing the bit rate allocator module to be aware of the modified value without instructing the bit rate allocator to introduce the desired change.

11. The non-transitory computer readable medium according to claim 10, wherein the non-transitory computer readable medium stores instructions for modifying a value of metadata indicative of the bit rate associated with the first stream.

12. The non-transitory computer readable medium according to claim 11, wherein the metadata comprises congestion control metadata or flow control metadata.

13. The non-transitory computer readable medium according to claim 10, wherein the non-transitory computer readable medium stores instructions for determining in response to bit rates allocated for streaming portions of other streams that are destined to at least one entity that differs from the target entity.

14. The non-transitory computer readable medium according to claim 10, wherein the non-transitory computer readable medium stores instructions for determining in response to at least one out of a source entity attribute and a target entity attribute.

15. The non-transitory computer readable medium according to claim 10, wherein the non-transitory computer readable medium stores instructions for determining in response to a quality of service level assigned to the first stream.

16. The non-transitory computer readable medium according to claim 10, wherein the non-transitory computer readable medium stores instructions for modifying the value of the bit rate associated with the first stream such as to cause the bit rate allocator to increase the bit rate allocated by the bit rate allocator to the streaming of the portion.

17. The non-transitory computer readable medium according to claim 10, wherein the non-transitory computer readable medium stores instructions for modifying a timing of a transmission of acknowledgements sent by the bandwidth management module to the bit rate allocator so that the timing of the transmission of the acknowledgements fits a desired round trip time (RTT) and thereby affecting the bit rate allocation applied by the bit rate allocator.

18. The non-transitory computer readable medium according to claim 10, wherein the non-transitory computer readable medium stores instructions for selecting a version of the portion out of multiple versions of the portions, the multiple versions differ from each other by bit rate.

19. A system comprising a bandwidth management module that comprises: a processor arranged to determine to introduce a desired change in a bit rate allocated by a bit rate allocator for streaming a portion of a first stream; wherein the first stream flows from a source entity to a target entity; wherein the source and target entities are coupled to the bit rate allocator and to the bandwidth management module; wherein the bit rate allocator sets the bit rate allocated to the streaming of the portion in response to a bit rate associated with the first stream;

a modifier arranged to modify a value of the bit rate associated with the first stream to provide a modified value; wherein when the desired change is an increase in the bit rate, the modifying comprises sending, by the bandwidth management module, a message that indicates that the network has more available bandwidth than the network actually has; wherein when the desired change is a decrease in the bit rate, the modifying comprises sending, by the bandwidth management module, a message that indicates a false state of congestion in the network; wherein the modifying causes the bit rate allocator to introduce the desired change in the bit rate allocated for streaming the portion; wherein the bandwidth management module (a) differs from the bit rate allocator, (b) is coupled to the bit rate allocator, and (c) is located between the target entity and the bit rate allocator; and an interface arranged to cause the bit rate allocator module to be aware of the modified value without instructing the bit rate allocator to introduce the desired change.

\* \* \* \* \*